United States Patent

Gaskins et al.

[11] Patent Number: 5,835,929
[45] Date of Patent: Nov. 10, 1998

[54] METHOD AND APPARATUS FOR SUB CACHE LINE ACCESS AND STORAGE ALLOWING ACCESS TO SUB CACHE LINES BEFORE COMPLETION OF A LINE FILL

[75] Inventors: Darius Gaskins; Glenn Henry, both of Austin, Tex.

[73] Assignee: Integrated Device Technology, Inc., Santa Clara, Calif.

[21] Appl. No.: 927,552

[22] Filed: Sep. 6, 1997

Related U.S. Application Data

[63] Continuation of Ser. No. 65,073, May 20, 1996.
[51] Int. Cl.$^6$ ................................................. G06F 12/00
[52] U.S. Cl. ................................ 711/3; 711/145; 711/144
[58] Field of Search ................................. 711/3, 119, 122, 711/145, 144

[56] References Cited

U.S. PATENT DOCUMENTS

| | | | |
|---|---|---|---|
| 4,912,631 | 3/1990 | Lloyd | 711/118 |
| 5,367,660 | 11/1994 | Gat et al. | 711/3 |
| 5,586,293 | 12/1996 | Baron et al. | 711/118 |
| 5,644,752 | 7/1997 | Cohen et al. | 711/122 |

*Primary Examiner*—Tod R. Swann
*Assistant Examiner*—Esteban A. Rockett
*Attorney, Agent, or Firm*—James W. Huffman

[57] ABSTRACT

A method and apparatus for tracking the fill status of sub cache line locations during a cache line fill operation is provided. The tracking system monitors the data cycles of a burst read during a cache line fill, and sets indicators pertaining to which of the sub cache lines within the cache line have been filled. Cache control utilizes the indicators to make those sub cache lines that have been filled available to a processing system as they are filled, rather than waiting for the entire cache line to be filled. Data is stored directly into sub cache line locations without requiring a cache line buffer.

19 Claims, 6 Drawing Sheets

METHOD AND APPARATUS FOR SUB CACHE LINE ACCESS AND STORAGE ALLOWING ACCESS TO SUB CACHE LINES BEFORE COMPLETION OF A LINE FILL

CROSS REFERENCE TO RELATED APPLICATION(S)

This application is a continuation of U.S. patent application Ser. No. 08/650,733 filed May 20, 1996.

BACKGROUND

1. Field of the Invention

This invention relates in general to the field of cache memory in computer systems, and more particularly to an improved method and apparatus for storing and accessing data within a cache memory.

2. Description of the Related Art

Modern computer systems employ a number of different memory devices and memory architectures to store instructions which will be executed, or data which will be processed. The types of devices used, and the manner in which they are connected, vary from system to system, depending on a designer's criteria.

In most computer systems, an important tradeoff that is made is that of speed versus cost. Faster execution speed is more costly. This is especially true when designing memory systems. A brief review of memory devices will help illustrate this point.

A simple computer includes a processing system which reads instructions from a memory system, reads data required by the instructions from the memory system, executes the instructions, and stores the results of the operations back to the memory system. If the processing system is required to wait on the memory system, either in reading instructions or data, or in writing data, the performance of the system is negatively effected. A typical goal of a computer system designer is to provide a memory system that creates minimum delays for the processing system, at the lowest possible cost.

Memory systems often include a combination of different types of memory devices, each provided for a particular purpose. For example, a hard disk drive is a memory device that provides a large area for permanent storage of instructions and data at a relatively nominal cost. It is not uncommon to find hard disk drives which store between 1.6 and 2 gigabytes of information for less than $300. However, by processor standards, hard drives are very slow. Other examples of mass storage devices include floppy drives, optical disks, and digital tapes.

A second type of memory device is a dynamic random-access-memory, or DRAM. A DRAM provides temporary storage for instructions and data, and is several orders of magnitude faster than a hard disk drive. However, DRAM is also more expensive. The same $300 invested in DRAM will provide only 16 to 24 megabytes of storage.

A third type of memory device is a static random-access-memory, or SRAM. An SRAM provides temporary storage for instructions and data, and is significantly faster than DRAM. However, it is even more expensive. The same $300 invested in SRAM will only provide between 256 and 512 kilobytes of storage.

Early memory systems provided a hard disk drive as the primary storage location for instructions and data, and placed DRAM between the hard disk drive and the processing system for temporary storage of data. During program execution, the processing system would attempt to read an instruction or data from the DRAM. If the requested instruction/data was present in the DRAM, it would be provided to the processing system with only nominal delay. However, if the instruction were not present in the DRAM, a request would be made to the hard disk drive to transfer the instruction/data to the DRAM. The hard drive would transfer a block of information, e.g., about 2000 bytes, to the DRAM, a byte a time. The DRAM could then provide the requested instruction/data to the processing system for execution. In addition, the DRAM could often provide subsequent instructions/data from the DRAM, at least until a request came from the processing system for instructions/data outside of the 2k block that had been transferred from the hard drive. However, until the first requested instruction was received by the processing system, the processing system was required to wait, or halt processing.

A number of improvements have been made to try to minimize transfer requests between DRAM and the hard disk, or to try to ensure that instructions/data requested by the processing system are present in the DRAM at the time of the request. One improvement is simply to increase the amount of DRAM in the computer system. The more DRAM in a computer system, the more likely the instructions/data requested by the processing system will be present. A second improvement has been to include memory management systems which attempt to determine which instructions/data in the DRAM will most likely be needed in subsequent operations, and try to keep this information from being overwritten, or anticipate which data that is not presently in DRAM will be needed in the future, and access the hard drive prior to the information/data being requested by the processing system.

As execution speed of processing systems have increased, so has the speed of DRAM and hard disk drives. However, the speed of processing systems have outpaced that of DRAM to the point where reading from or writing to DRAM requires the processing system to wait. To overcome this wait, high speed SRAM is placed between the DRAM and the processing system to temporarily store instructions/data. The high speed SRAM that is placed between the DRAM and the processing system is called a cache. The purpose of the cache is to provide temporary storage for a subset of the instructions/data which are stored in DRAM, yet provide the subset of instructions/data to the processing system faster than the DRAM.

For example: A processing system requests an instruction/data from the memory system. If the instruction/data is present in SRAM, the instruction/data is provided to the processing system with zero wait states, i.e., the SRAM does not cause the processing system to wait for the instruction/data. If the SRAM does not contain a copy of the requested instruction/data, the processing system must go to the DRAM. If the instruction/data is available in DRAM, the data is provided to the SRAM, along with other instructions/data which will likely be needed in subsequent operations. The SRAM then provides the requested instruction/data to the processing system. In some instances, the requested data is provided directly to the processing system in parallel with providing it to the SRAM.

If the requested data is not available in DRAM, the hard drive is accessed. The hard drive provides a block of data to the DRAM, a portion of which is also copied to SRAM. The SRAM then provides the data to the processing system.

What should be apparent from the above is that as long as the requested instructions/data are present in SRAM, the processing system is not required to wait, or halt execution. However, when a request is made that cannot be provided by the SRAM, the processor has to wait, and performance is affected. When such a situation occurs, it is desirable that the requested instruction/data be provided to the processing system as soon as possible. However, as alluded to above, transfers between the hard disk and DRAM, and between DRAM and SRAM do not often occur a byte at a time. Rather, transfers between the hard disk and DRAM often occur in large chunks, e.g., at least 2000 bytes, while transfers between the DRAM and SRAM occur a cache line at a time. Those skilled in the art will appreciate that the size of a cache line varies with the architecture of the computer, but contains a number of locations, where each location contains a number of bytes of instructions/data.

One of the reasons that instructions/data are transferred between DRAM and SRAM a cache line at a time is based on the principle of locality. The locality principle states that programs typically operate on instructions/data that are close in proximity to the instructions/data immediately proceeding them. Therefore, if a request is made for an instruction/data which is not in SRAM, it is very likely that future requests will be made to instructions/data which surround the requested instruction/data. If an entire cache line is brought into the SRAM from the DRAM, then subsequent requests for instructions/data will likely be found in the cache line, and will not require wait states. Thus, one of the goals of a memory system designer is to provide a cache system which improves the likelihood that an instruction/data request from the processing system will be found within the cache.

Having provided a general understanding of how different memory systems are used within a computer system, a more specific description of one of the problems associated with storing instructions/data into a cache will be described.

As stated above, cache memory is broken up into a number of cache lines, where each line provides storage for a number of addressable locations, each location being several bytes in width. Typically, an addressable location within a cache memory has the same byte width as that of the data bus of the computer system into which it is placed. When a processing system requests an instruction/data, and the instruction/data is not located within the cache, a "miss" occurs. The instruction/data must be retrieved from DRAM, or from the hard disk. To "fill" the cache with the requested data, the processing system, or some other control mechanism, typically performs a burst which fills the cache with the requested data, and with data surrounding the requested data in an amount to completely fill a cache line.

For example, if a cache line included four addressable locations, and each location was eight bytes in width, a burst would perform four back to back transfers, eight bytes at a time, to fill the entire cache line. Once the cache line is filled, the requested data is provided to the processing system. By bursting data into a cache to fill an entire cache line, time spent retrieving future cache locations is minimized. However, an additional delay is created for the processing system. Rather than having to wait until the requested location is transferred from DRAM or hard disk, the processing system must wait until the entire cache line is filled before it can access the requested data. This creates added delay for the processing system.

An improvement to the above situation has been provided in some systems which allow the requested data to be forwarded to the processing system in parallel with providing the data to the cache. Thus, as soon as the requested data is available to the cache, it is forwarded to the processing system. However, subsequent requests to access data in other locations within the cache line require the processing system to wait until the entire cache line is filled. This is true even if the particular location of interest has been stored within the cache system. Thus, requiring a processing system to wait until an entire cache line is filled before allowing access to data within a cache line, creates delays in the processing system. What is needed is a method and apparatus which fills a cache line, but which also provides immediate access to locations within a cache line, even before the entire cache line is filled.

SUMMARY

For the foregoing reasons, there is a need for an apparatus and method for storing a cache line within a cache memory system which allows access to sub cache lines, even before the entire cache line is filled.

To address the above-detailed deficiencies, it is an object of the present invention to provide an apparatus and method which fills an entire cache line, while providing access to sub cache line locations, before the entire cache line is filled.

Accordingly, in the attainment of the aforementioned object, it is a feature of the present invention to provide a computer memory system for storing data, and for providing the data to a processing system, the computer memory system including: main memory, connected to the processing system, for storing the data, and for providing the data to the processing system; a cache memory system, connected to the processing system, and to the main memory, also for storing the data, and for providing the data to the processing system. The cache memory system includes: a cache memory array, having a plurality of cache lines, each of the cache lines having a plurality of sub cache line locations, the sub cache line locations for storing the data; a cache directory, associated with the cache memory array, for storing tag information associated with the data stored in the cache memory array; and a cache enable system, connected to the cache memory array, to the cache directory, and to the processing system. The cache enable system includes: a plurality of sub cache line enable bits associated with the sub cache line locations within at least one of the cache lines; and cache enable logic, for reading the tag information and the plurality of sub cache line enable bits to determine whether specific data requested by the processing system is stored in the cache memory array, and for allowing the cache memory array to provide the specific data to the processing system even when the cache line containing the specific data is not completely filled.

Another feature of the present invention is to provide the computer memory system described above where the main memory is connected to the processing system via signal buses.

An additional feature of the present invention is to provide the computer memory system described above where the signal buses include: an address bus, for transmitting address information; and a data bus, for transferring data between the main memory and the processing system.

An further feature of the present invention is to provide the computer memory system described above where the cache memory system is also connected to the main memory and to the processing system via the signal buses.

Yet another feature of the present invention is to provide the computer memory system described above where each of the cache lines are filled from the main memory by a burst cycle on the data bus.

An additional feature of the present invention is to provide the computer memory system described above where the burst cycle transfers data from the main memory to one of the cache lines in the cache memory a sub cache line location at a time, until the cache line is filled.

A further feature of the present invention is to provide the computer memory system described above where the cache directory includes a plurality of tag locations for storing the tag information, the plurality of tag locations corresponding to each of the plurality of cache lines in the cache memory array.

An additional feature of the present invention is to provide the computer memory system described above where the tag information includes: address information corresponding to addresses of the main memory; state information indicating whether data stored in a corresponding cache line is valid; and fill information for indicating whether at least one of the sub cache line locations within the corresponding cache line has been filled.

A further feature of the present invention is to provide the computer memory system described above where as each of the sub cache line locations within a cache line are filled, the cache enable logic sets a corresponding bit within the sub cache line enable bits indicating that the corresponding sub cache line location has been filled.

Another feature of the present invention is to provide the computer memory system described above where the cache enable logic reads the state information and the fill information from the tag information, and the plurality of sub cache line enable bits associated with the sub cache line locations, to determine whether specific data requested by the processing system is stored in the cache memory array.

An additional feature of the present invention is to provide a cache memory system for storing a subset of data that is also stored in a main memory, and for providing the subset of data to a processing system. The cache memory system includes: a cache memory array, connected to the main memory, and to the processing system, the cache memory array including: a plurality of cache lines, the cache lines for temporarily storing the subset of data, the plurality of cache lines including: a plurality of sub cache line locations; a cache directory, associated with the cache memory array, for storing tag information associated with the subset of data, the cache directory including: a plurality of tag lines, corresponding to the plurality of cache lines, the tag lines for temporarily storing tags associated with the plurality of cache lines, the tags including: address information, corresponding to addresses of the subset of data stored in the main memory; and state information, indicating the states of the subset of data stored in the plurality of cache lines; and a cache enable system, connected to the cache memory array, and to the cache directory, for monitoring validity of the subset of data stored in the plurality of cache lines, and for allowing the plurality of cache lines to provide the subset of data to the processing system. The cache enable system includes: a plurality of sub cache line enable bits, associated with the sub cache line locations within at least one of the cache lines, the plurality of sub cache line enable bits for indicating whether sub cache line location data within the sub cache line locations within the cache lines is valid; and cache enable logic, for reading the plurality of sub cache line enable bits, and the tags associated with the plurality of cache lines, to determine whether the sub cache line location data within the cache lines is valid; wherein the cache enable system provides the valid sub cache line location data to the processing system even when other sub cache line data within the cache lines is not valid.

Yet another feature of the present invention is to provide the cache memory system as described above where the cache memory array is connected to the main memory via signal buses.

A further feature of the present invention is to provide the cache memory system as described above where the signal buses include: an address bus, for transferring the address information, corresponding to addresses of the subset of data stored in the main memory; and a data bus, for transferring the subset of data from the main memory to the cache memory system, and for transferring the subset of data from the cache memory system to the processing system.

Yet another feature of the present invention is to provide the cache memory system as described above where the data bus transfers the subset of data from the main memory to the cache memory system, a sub cache line location at a time.

An additional feature of the present invention is to provide the cache memory system as described above where the data bus transfers a portion of the subset of data to the cache memory in back to back transfers until all of the plurality of sub cache line locations within one of the plurality of cache lines are filled.

Another feature of the present invention is to provide the cache memory system as described above where for each of the plurality of cache lines there is a corresponding one of the plurality of tag lines.

A further feature of the present invention is to provide the cache memory system as described above where the tags further include: fill information, indicating whether any one of the plurality of sub cache line locations within a specific one of the plurality of cache lines contains valid data.

Yet another feature of the present invention is to provide the cache memory system as described above where the cache enable system updates the plurality of sub cache line enable bits, one bit at a time, as the sub cache line locations within the one of said plurality of cache lines are filled.

A further feature of the present invention is to provide the cache memory system as described above where the cache enable system makes available to the processing system each of the sub cache line locations within the one of the plurality of cache lines as the cache line locations are filled.

Another feature of the present invention is to provide a method for providing data, from a cache to a processing system, during a cache line fill, where the cache includes a plurality of cache lines, and where each of the plurality of cache lines include a plurality of sub locations, the method includes the following steps: filling the plurality of sub locations from a source thereof; tracking which of the plurality of sub locations are filled, and which have not been filled; and if requested by the processing system, providing the sub locations which are filled to the processing system.

A further feature of the present invention is to provide the method as described above where the sub locations are part of a cache line that is addressable by the processing system.

An advantage of the present invention is that no pipeline stalls are required to allow an instruction queue to be filled. By filling the instruction queue without stalls, there will be less chance that bubbles, or holes, in the pipeline will exist. And, the less holes in a pipeline, the better the performance.

Additional objects, features and advantages of the invention will be described hereinafter. Those skilled in the art should appreciate that they can readily use the disclosed conception and specific embodiment as a basis for designing or modifying other structures for carrying out the same purposes of the present invention.

DESCRIPTION OF THE DRAWINGS

The present invention will become better understood with regard to the following description, and accompanying drawings where.

DETAILED DESCRIPTION

As mentioned above, as processor speeds increased, the speed of DRAM increased at a slower pace. Thus, to gain the maximum performance benefit of faster processors, faster random-access-memory (RAM) is used. However, because of the expense of faster RAM, a combination of slow DRAM, and fast SRAM is often chosen. The use of SRAM within a memory system is referred to as cache.

Figure 1:
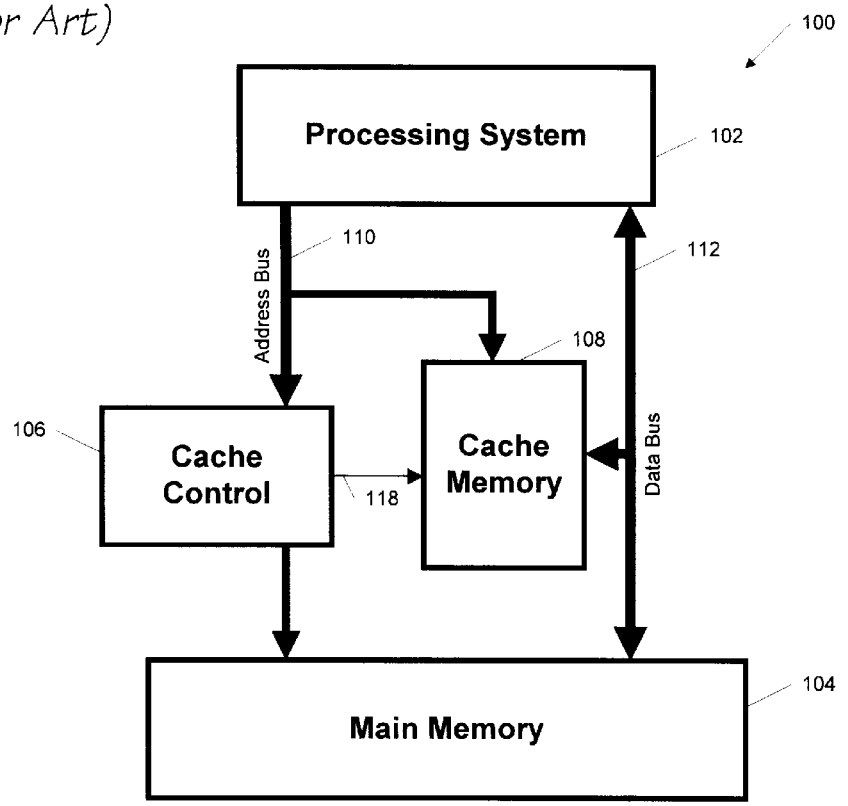
FIG. 1 is a block diagram of a prior art computer system having a cache memory system.

Referring to FIG. 1, a block diagram of a prior art computer system 100 is shown. The computer system 100 includes a processing system 102 connected to a main memory 104, via an address bus 110 and a data bus 112. Also shown is a cache control 106 connected to a cache memory 108. The cache control 106 is connected to the address bus 110, and the cache memory 108 is connected to both the address bus 110, and the data bus 112. The cache control 106 is connected to the cache memory via an enable signal 118. The cache memory 108 is typically populated with a small amount of high speed SRAM, while the main memory 104 is populated with a larger amount of relatively slow access DRAM.

In operation, the processing system 102 reads instructions and/or data from the main memory 104, executes the instructions, or operates on the data, and stores results back into the main memory 104. More specifically, the processing system 102 provides an address for each desired instruction/data on the address bus 110. The main memory 104 uses the address provided on the address bus 110 to retrieve the desired instruction/data, and provides it to the processing system 102 via the data bus 112.

The cache control 106 attempts to maintain copies of frequently accessed information read from the main memory 104 in the cache memory 108. When the cache control 106 sees the processing system 102 initiate a memory read bus cycle, it checks to determine whether it has a copy of the requested information in the cache memory 108. If a copy is present, the cache control 106 immediately reads the information from the cache memory 108, and transfers the read information back to the processing system 102 via the data bus 112. If the cache control 106 determines that it does not have a copy of the requested information in the cache memory 108, the information is read from main memory 104. This is known as a read "miss" and results in wait states, causing the processing system 102 to delay processing. The requested information is sent from the main memory 104 back to the processing system 102 to fulfill the request. In addition, the information is also copied into the cache memory 108 by the cache control 106. The next time the processing system 102 wishes to access the requested information, it can be provided by the cache memory 108 without any wait states.

Figure 2:
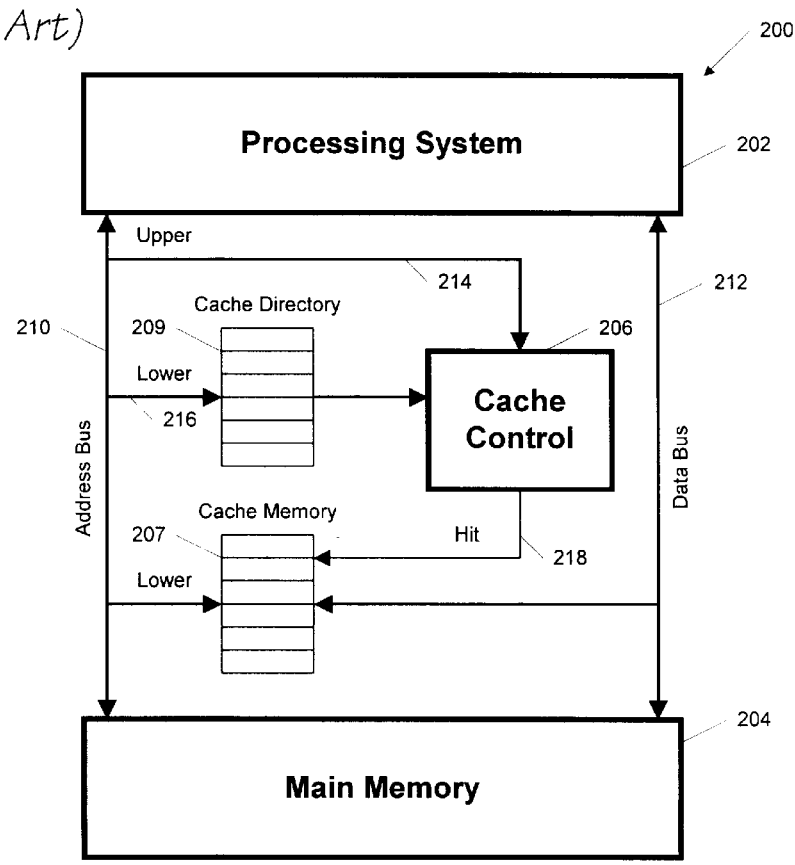
FIG. 2 is a block diagram of a prior art computer system having a cache memory system, further illustrating a cache memory and a cache directory.

Now referring to FIG. 2, a block diagram of a prior art computer system 200 is shown. Like elements are referred to with like numerals, with the hundreds digit 2 replacing the hundreds digit 1 of FIG. 1. In FIG. 2, the cache memory 108 is shown separated into a cache memory 207, and a cache directory 209. The cache directory 209 is connected to the lower address signals 216 of the address bus 210, with the upper address signals 214 connected to the cache control 206. The cache memory 207 is also connected to the lower address signals 216 of the address bus 210. An enable signal line 218 is provided which connects the cache control 206 to the cache memory 207.

In operation, when the processing system 202 requests information from the main memory 204, the cache control 206 compares the memory address output by the processing system 202 with the cache directory 209 which contains a record of which locations are stored in the cache memory 207. If a match occurs, the cache control 206 enables the cache memory 207, via the enable signal line 218, to output the information from the addressed location onto the data bus 212. If a match does not occur, the requested information is supplied by the main memory 204, with wait states. The information is sent back to the processing system 202 from the main memory 204, and is also stored in the cache memory 207. The contents of the cache directory 209 are updated each time new information is stored in the cache memory 207.

Figure 3:
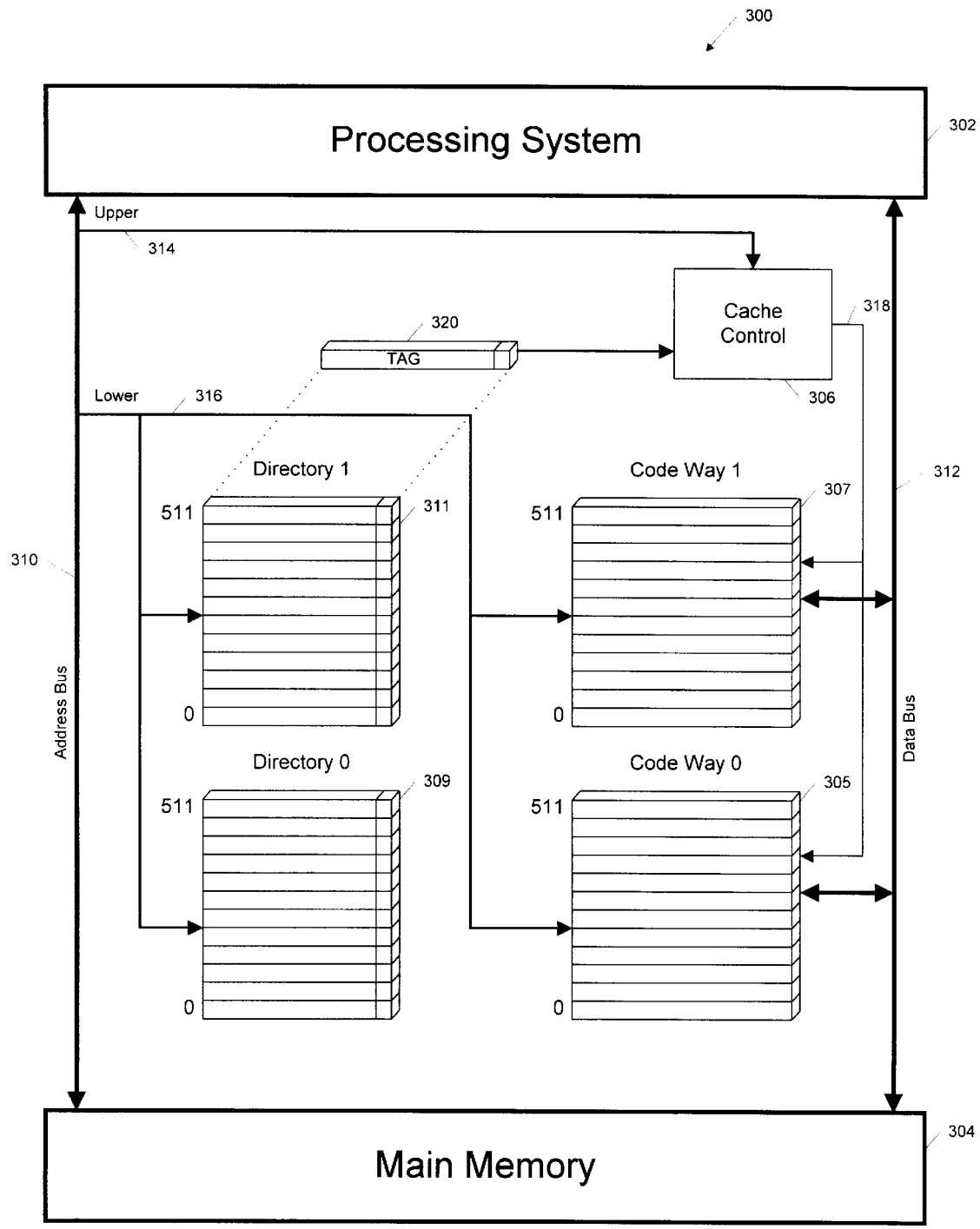
FIG. 3 is a block diagram of a prior art computer system illustrating a two-way set-associative cache memory.

Now referring to FIG. 3, a block diagram of a prior art computer system 300 is shown which illustrates a two-way set-associative cache. The computer system 300 includes a processing system 302 connected to a main memory 304 via an address bus 310 and a data bus 312. Between the processing system 302 and the main memory 304 is a cache memory system. The cache memory system includes: cache control 306 connected to the upper address bits 314; cache memory which is split into code way 0, 305, and code way 1, 307; and a cache directory which is split into directory 0, 309, and directory 1, 311. Expanded out from cache directory 1, 311, is a TAG 320. In this example, a TAG 320 exists for, and is associated with, every cache line within the cache memory 305, 307. The TAG 320 stores a record of which location in main memory 304 is stored in its associated cache line in the cache memory 305, 307. The TAG 320 is used by the cache control 306 to compare requests made by the processing system 302 with the contents of the cache memory 305, 307.

In a two-way set-associative cache, when the cache control 306 gets information from the main memory 304, it has a choice of two cache memory banks to store the data in, i.e., code way 0, 305, and code way 1, 307. Cache banks are frequently referred to as ways. In other words, the controller must choose one of two ways to store the data in. Each of the code ways has its own directory 309, 311. Since there are two ways for information to be cached in, each memory request is now compared to two directory entries to determine whether or not the information is currently stored in the cache. For a more complete description of cache memory systems, please see *ISA SYSTEM ARCHITECTURE*, 3$^{rd}$ ed., Tom Shanley, Don Anderson.

Figure 4:
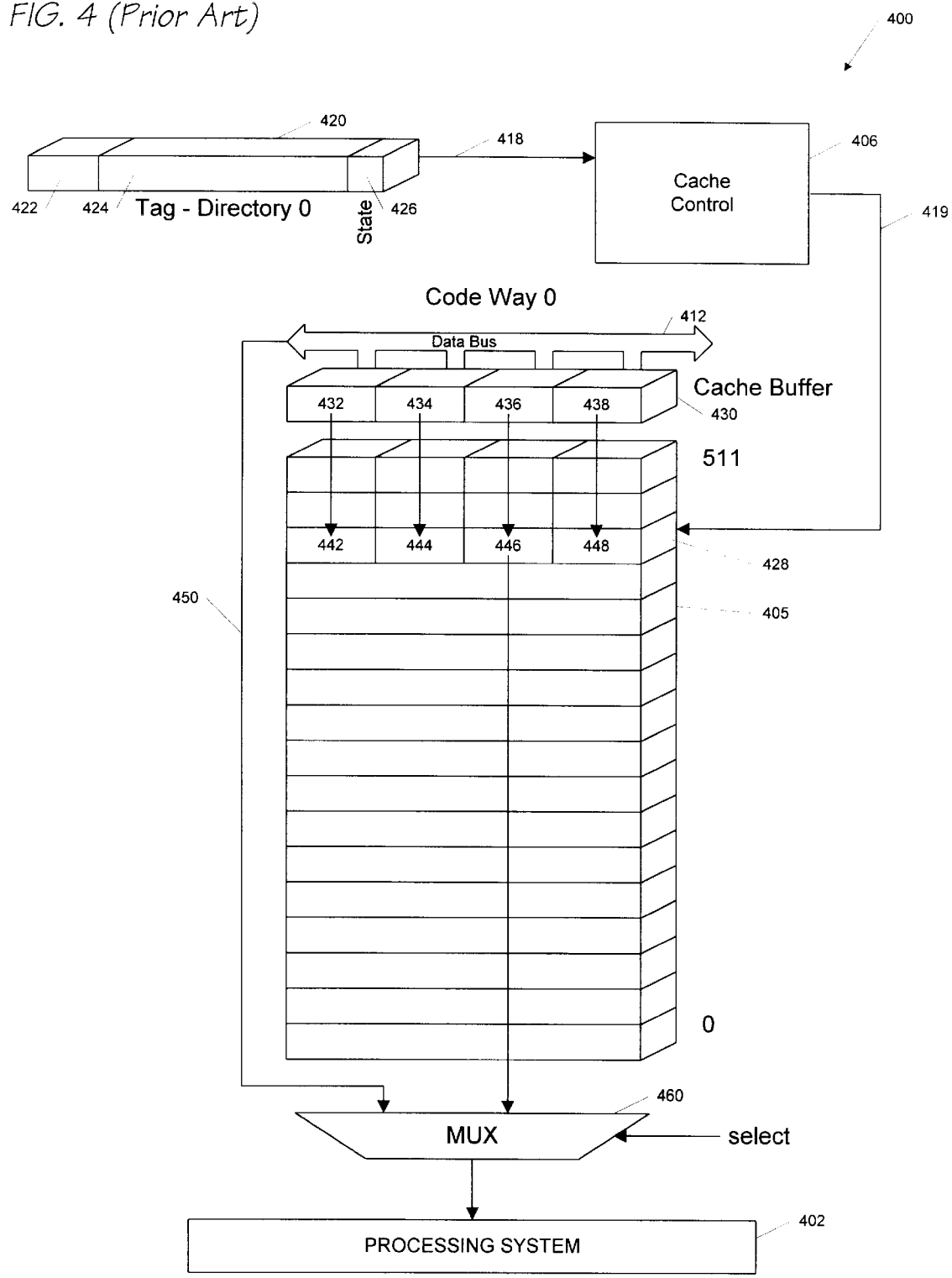
FIG. 4 is a block diagram of a prior art cache memory illustrating a cache line, sub cache lines, and a cache buffer.

Now referring to FIG. 4, a block diagram of a prior art cache system 400 is shown. More specifically, a code way 0, 405 is shown, connected to a processing system 402. The code way 405 contains a plurality of cache lines 428, each of which contain a number of sub cache line locations 442, 444, 446, and 448. The cache line locations 442–448 are connected to associated buffer locations 432, 434, 436 and 438 within a cache buffer 430. The cache buffer 430 is connected to a data bus 412.

Also shown in FIG. 4 is a TAG 420. The TAG 420 is divided into a number of distinct bit locations 422, 424 and 426, each of which provide information relating to the location in memory which is stored in an associated cache line, as well as the status and validity of the associated cache line. One skilled in the art will appreciate that a TAG 420 exists for each cache line 428 within the cache system 400.

As discussed above, when a cache miss occurs, the cache system 400 must go to main memory 304 to get the requested information. In most environments, the cache system 400 is designed to fetch more information than is actually requested. By prefetching instructions that the processing system 302 will require in the near future, as needed they can be provided by the cache system. The amount of information fetched from main memory 304 by the cache control 306 is defined as a cache line. Line size varies according to design, but typically ranges from 4 bytes to 32 bytes. Heretofore, the cache line is the smallest unit of information that a cache can map. This means that each time a cache miss occurs an entire line of information must be read from the main memory 304. This is called a cache line fill.

Referring to FIGS. 3 and 4, the processing system 402 requests information from the main memory 304. The cache control 406 compares the address for the requested information with the contents of the cache directories 309, 311. If a cache miss occurs, the data must be provided from the main memory 304, and a cache line fill is initiated. As shown in FIG. 4, each cache line 428 is divided into four sub cache line locations 442–448. Each of the sub cache line locations contains a plurality of bytes corresponding to the width of the data bus 412. For purposes of illustration, the data bus 412 is selected to be 64 bits, or eight bytes wide.

The main memory 304 begins providing the requested information eight bytes at a time to the cache buffer 430. The first eight bytes transferred from the main memory 304 over the data bus 412 is stored in sub cache line buffer 432. The next eight bytes are stored in sub cache line buffer 434. The third set of eight bytes is stored in sub cache line buffer 436, and the fourth set of eight bytes is stored in sub cache line buffer 438. One skilled in the art will appreciate that the order in which eight byte transfers are stored in the sub cache line buffers may vary according to design. At this point, the data transfer for the cache line 428 has been completed. However, the data is still not available to the processing system 402. The sub cache line buffers 432–438 within the cache buffer 430 must be transferred to an addressable cache line 428 within the cache memory 405. As this transfer occurs, the TAG 420 associated with the cache line 428 into which the data is transferred is updated to reflect the address in the main memory 304 that is stored in the cache line 428, as well as the status of the cache line 428. The status, in this instance, is valid, indicating to the cache control 406 that the data within the cache line 428 is the same as that of the main memory 304, at the address referenced by the associated TAG 420.

Once the cache buffer 430 has transferred the data to the cache line 428, and the TAG 420 has been updated, all of the sub cache lines 442–448 are available to the processing system 304. Thus, if the processing system 402 had requested data that was in the sub cache line 442, for example, it would have to wait until the entire cache line 428 was filled before gaining access to the data.

To overcome this delay, one improvement that has been made is to include a forward bus 450 between the data bus 412 and a mux 460. The forward bus 450 takes the first eight bytes transferred from the main memory 304 to the cache buffer 430, and provides them immediately to the processing system 402 via the mux 460. Use of the forward bus 450 helps overcome the delay associated with filling an entire cache line. However, the forward bus is only useful for the immediate request for data which initiated the cache line fill. For subsequent data requests that may be within the same cache line 428, the processing system 402 is still required to wait until the entire cache line 428 has been filled.

Figure 5:
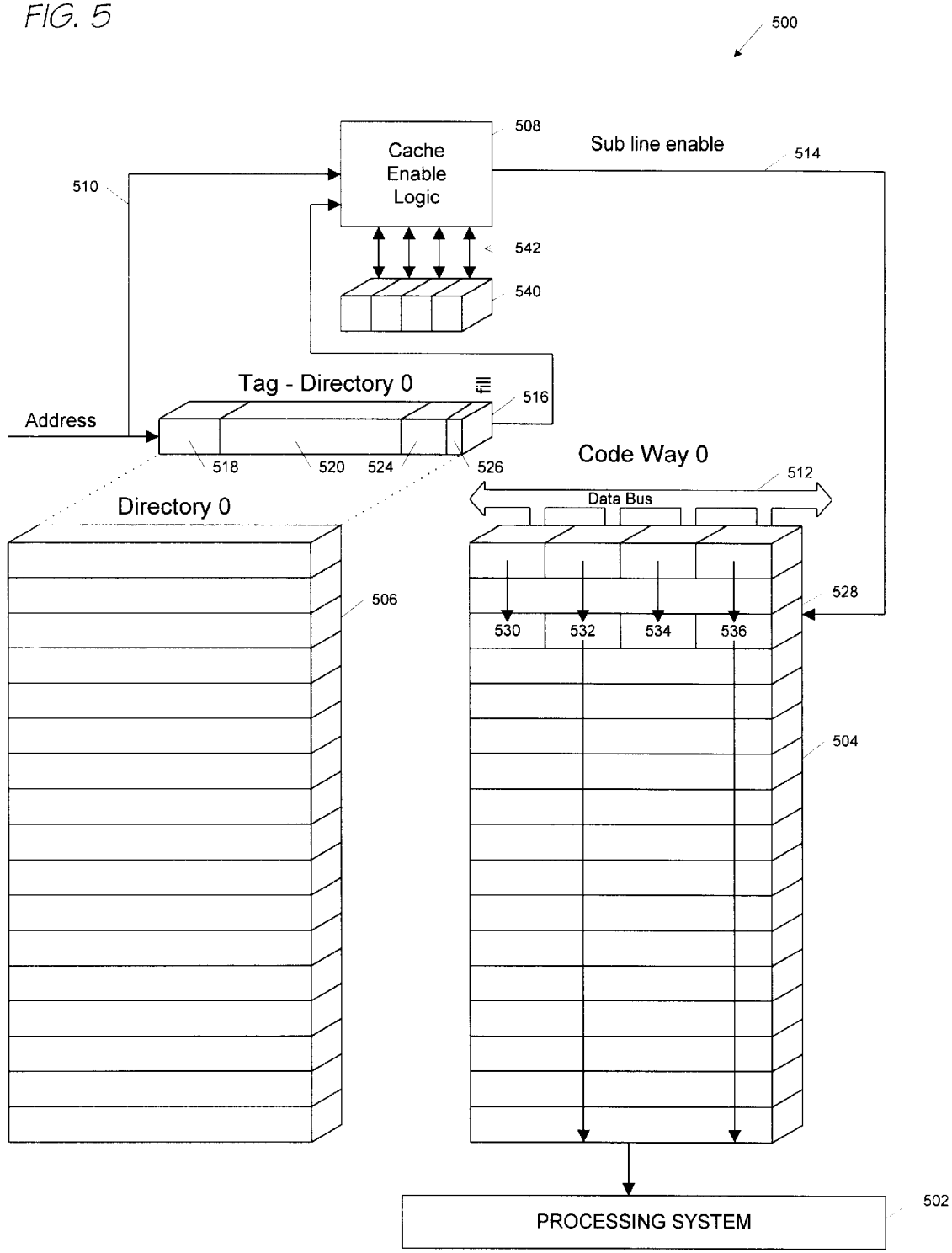
FIG. 5 is a portion of a cache memory system illustrating aspects of the present invention.

Now referring to FIG. 5, an improved cache system 500 according to the present invention is shown. The cache system 500 includes a processing system 502 connected to a cache memory 504. One skilled in the art should appreciate that the processing system 502 and the cache system 500 may reside on the same chip, as in a microprocessor having an internal cache, or may be located on at least two separate chips (external cache). Additionally, it should be appreciated that the cache system 500 could be used to store both data and code, or may be used in either the instruction cache, or the data cache of a processor.

The cache memory 504 is also connected directly to a data bus 512. Associated with the cache memory 504 is a cache directory 506 which is connected to an address bus 510. Shown expanded from the cache directory 506 is a TAG 516 which is connected to cache enable logic 508. The cache enable logic 508 is connected to the cache memory 504 via a sub line enable signal line 514. Also shown are a plurality of sub cache line status bits 540 connected to the cache enable logic 508 via a status bus 542. The cache memory 504 includes a plurality of cache lines 528, each of which contain a plurality of sub cache lines 530, 532, 534 and 536. In one embodiment, there are 512 cache lines within each cache memory 504, and each cache line 528 contains four 64-bit, or 8-byte, sub cache lines.

The TAG 516 contains a plurality of bit segments 518, 520, and 522 for tracking the address in memory of data stored in each cache line, and the state of each cache line. In addition, the TAG contains a fill bit 524 which indicates whether any of the sub cache lines within an associated cache line might be valid. Operation of the sub cache line enable bits 540, and the fill bit 524 will be discussed below.

When the processing system 502 initiates a read request, the address for the read is provided on the address bus 510 to both the cache directory 506, and the cache enable logic 508. As discussed above, the upper address bits may be provided to the cache enable logic 508, and the lower address bits may be provided to the cache directory 506. The cache enable logic 508 determines that the requested data does not exist within the cache memory 504. So a cache line fill is initiated.

The first eight bytes of the cache line fill are provided via the data bus 512 directly to the appropriate cache line 528, and to sub cache line 530. At this point, the associated TAG 516 within the cache directory 506 is updated to reflect the address of the cache line 528, and the status of the cache line 528. In addition, the fill bit 524 is set to indicate that at least a portion of the cache line has been filled, and is valid. Also, the cache enable logic 508 sets an associated bit within the sub cache line enable bits 540 to indicate that sub cache line 530 contains valid data. At this point, the cache enable logic 508 can select the contents of sub cache line 530, via the sub line enable line 514, to be provided to the processing system 502, without waiting for the entire cache line to be filled.

As the second set of eight bytes are transferred to the sub cache line 532, the cache enable logic 508 updates an associated bit within the sub cache line enable bits 540 to indicate that sub cache line 532 contains valid data. The sub cache line 532 can now provide its contents to the processing system 502 without waiting for the rest of the cache line 528 to be filled.

As the third set of eight bytes are transferred to the sub cache line 534, the cache enable logic 508 updates an associated bit within the sub cache line enable bits 540 to indicate that sub cache line 534 contains valid data. The sub cache line 534 can now provide its contents to the processing system 502 without waiting for the rest of the cache line 528 to be filled.

As the fourth set of eight bytes are transferred to the sub cache line 536, the cache enable logic 508 updates the status of the associated TAG 516 to indicate that the entire cache line is now valid, and clears all of the sub cache line enable bits 540 readying them for the next cache line fill. The sub cache line 534 can now provide its contents to the processing system 502.

By providing a tracking mechanism for each sub cache line during a cache line fill, at least two benefits result. First, sub cache lines can be stored directly into the cache memory, without requiring a cache line buffer to hold the contents of each sub cache line until an entire cache line is filled. This eliminates hardware and cost associated with the cache memory. Second, by tracking the status of each sub cache line as it arrives, and by storing the sub cache lines directly into cache memory, the sub cache lines are made immediately available to the processing system, without waits usually associated with cache line fills.

Figure 6:
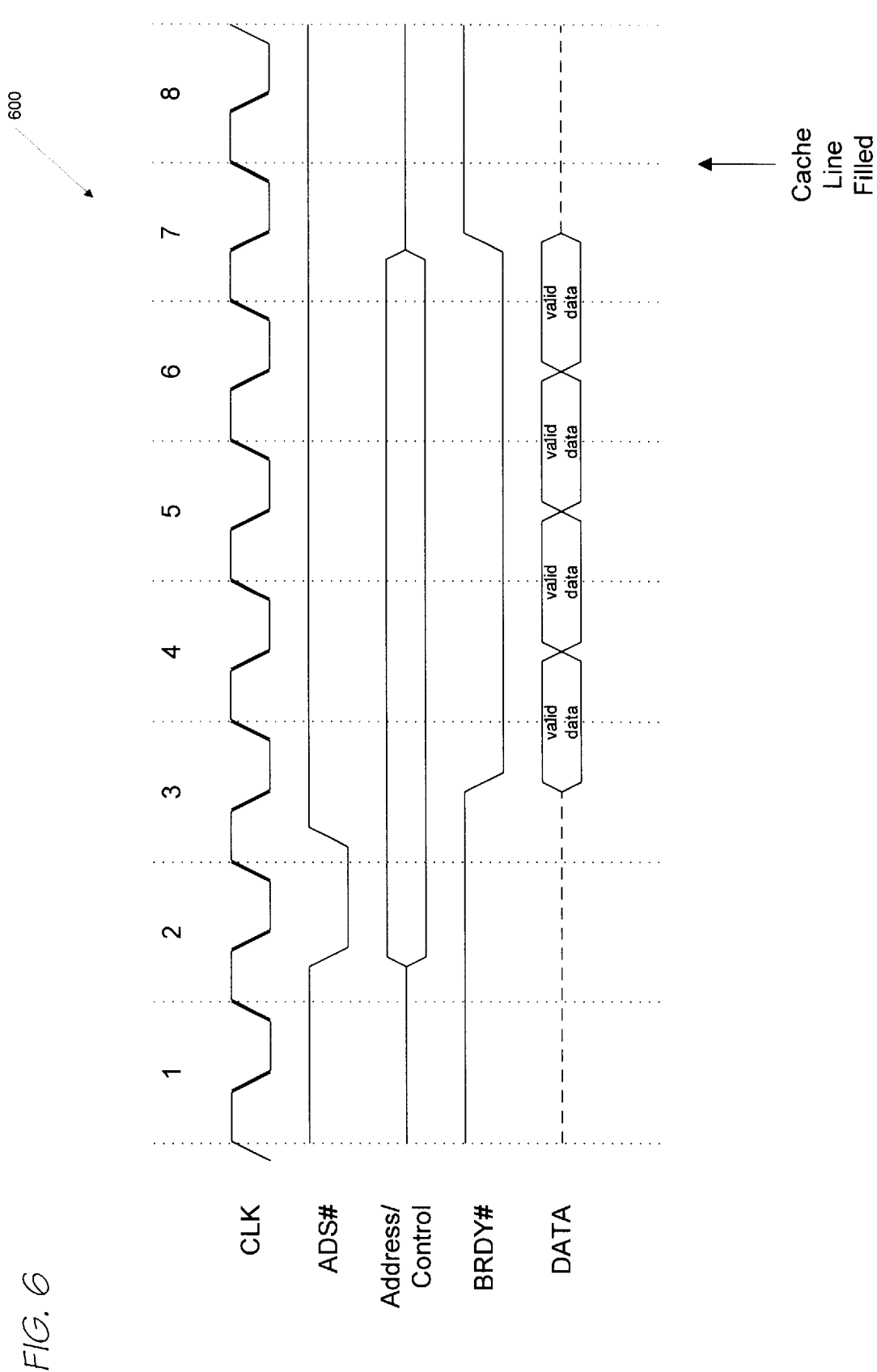
FIG. 6 is a timing diagram illustrating the operation of storing a cache line within a cache memory.

Referring to FIG. 6, a timing diagram 600 is provided which illustrates the time benefit of tracking sub cache lines during a cache line fill. The left side of the timing diagram 600 indicates various signal lines associated with reading data into a cache memory. Across the top are time intervals 1–8.

The first signal line is CLK. The CLK signal is used as a reference by the hardware on the system bus.

During clock cycle 2, an ADS# signal is driven by the processing system to indicate that a valid address is on the bus. Also during clock cycle 2, Address/Control signals are provided by the processing system to the memory system.

Ignoring wait states associated with retrieving data from main memory, during clock cycle 3, the main memory asserts BRDY# to tell the cache that valid data is on the data bus. During clock cycles 4–7, four eight-byte transfers occur between main memory and cache memory. The cache line is filled at the end of clock cycle 7.

What should be clear from FIG. 6 is that without the benefit of the present invention, any request by the processing system to obtain data during a cache line fill cannot be satisfied until clock cycle 8, i.e., until the entire cache line has been filled. But, by utilizing the sub cache line tracking mechanism discussed above, sub cache line data is made available to the processing system as it arrives from the main memory.

Figure 7:
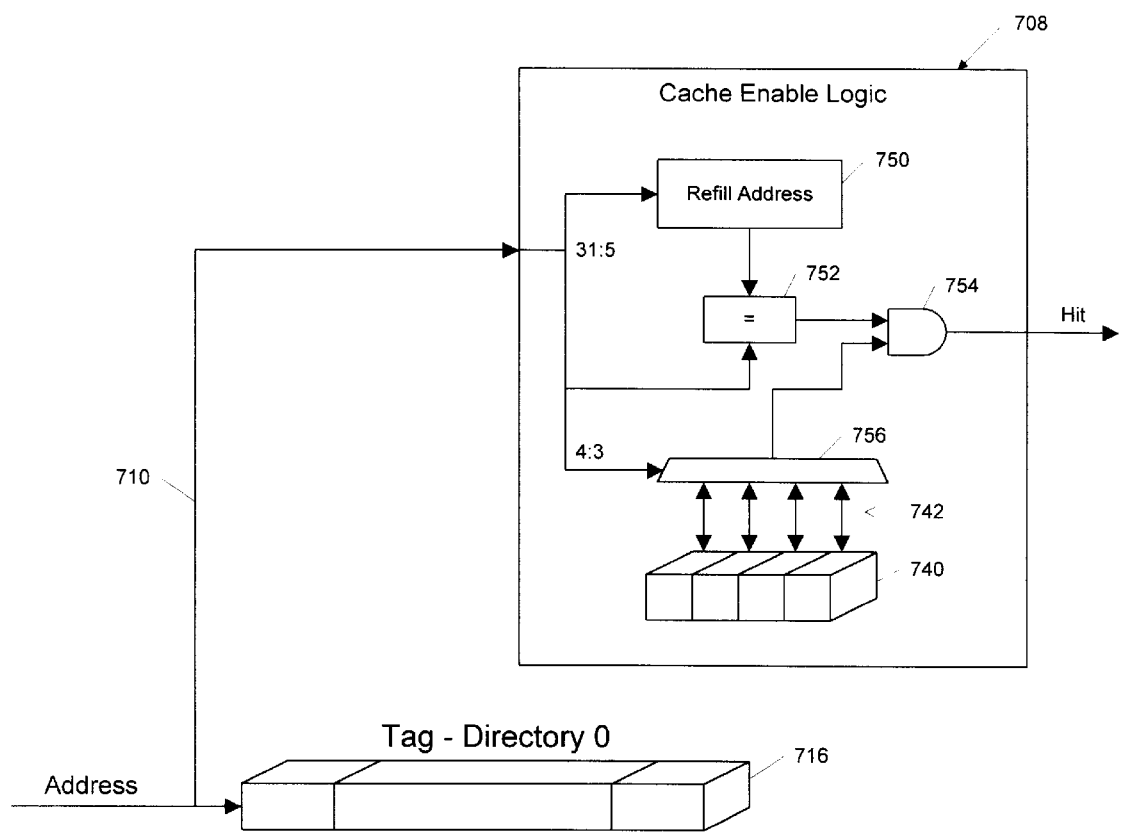
FIG. 7 is a block diagram of an alternate embodiment of the cache enable logic of FIG. 5.

Now referring to FIG. 7, an alternative embodiment of he cache control logic of FIG. 5 is shown. The cache control logic 708 is connected to the processing system (not shown) via address bus 710. Also connected to the address bus 710 is a tag directory 716. Within the cache control logic 708 is a refill address buffer 750, a comparator 752, an AND gate 754, a mux 756, and valid bits 740 connected to the mux 756 via buses 742.

In operation, rather than having a fill bit 526 associated with each tag line 516, when a cache line is requested to be filled, the address of the cache line is stored in the refill address buffer 750. As each sub cache line within the cache line is received, the valid bits 740 are updated. Subsequent access requests on the address bus 710 are compared to the contents of the refill address buffer 750 to determine whether the cache line being filled could contain the contents of the requested data. The output of the comparator 752 is provided as one of the inputs to the AND gate 754. In addition, the lower address bits 4:3 of the address bus 710 are used to select one of the four valid bits 740, as an output of the mux 756. The output of the mux 756 is used as the other input to the AND gate 754. If the upper address bits in the refill address buffer 750 are the same as the requested address, and the contents of the valid bits 740 at the selected bit location has a value of 1 (indicating that data for the sub cache line has been filled), then the AND gate 754 indicates a "hit", which allows the data to be provided. If, on the other hand, either the requested address is not the same as the contents of the refill address buffer 750, or the valid bits 740 do not indicate that the sub cache line has been received, then a "miss" occurs.

Although the present invention has been described in considerable detail with reference to certain preferred versions thereof, other versions are possible. For example, the sub cache line enable bits are not associated with each cache line, but rather, are reset each time a cache line fill is completed. Although it would be more costly, sub cache line enable bits could be provided for each cache line, and could be placed within the TAG associated with each cache line. In addition, the sub cache line enable bits could be replaced with logic which tracks sub cache line status. For example, the four bits shown in FIG. 5 could be replaced with two bits, and logic associated could set the bits with the four states 00, 01, 10, and 11 corresponding to which of the sub cache lines contained valid data. One skilled in the art should appreciate that other tracking mechanisms may be provided which allow a cache control to know which sub cache lines during a cache line fill contain valid data, and to allow a data to be stored directly into a cache line without requiring a cache buffer. It should also be understood that various changes, substitutions and alterations can be made herein without departing from the spirit and scope of the invention as defined by the appended claims.

We claim:

1. A computer memory system for storing data, and for providing the data to a processing system, the computer memory system comprising:

a cache memory array, having a plurality of cache lines, each of said cache lines having a plurality of sub cache line locations, said cache memory array allowing any of said plurality of sub cache line locations to be directly written into;

a directory, associated with said cache memory array, for storing information corresponding to said cache memory array; and cache enable logic, coupled to said directory, configured to determine whether data being requested by the processing system is within any one of said plurality of sub cache line locations, and for providing said requested data to the processing system even when a cache line containing said one of said plurality of sub cache line locations has not been completely filled.

2. The computer memory system as recited in claim 1, wherein said cache enable logic comprises a plurality of sub cache line enable bits associated with said sub cache line locations.

3. The computer memory system as recited in claim 2, wherein said cache enable logic determines whether data being requested by the processing system is within any one of said plurality of sub cache line locations by reading said information and said plurality of sub cache line enable bits.

4. The computer memory system, as recited in claim 2, wherein said plurality of sub cache line enable bits comprises a bit for each of said sub cache line locations within a single cache line.

5. The computer memory system, as recited in claim 2, wherein as each of said sub cache line locations within a cache line are filled, said cache enable logic sets a corresponding bit within said sub cache line enable bits indicating that said corresponding sub cache line location has been filled.

6. The computer memory system as recited in claim 1, wherein said information comprises tag information.

7. The computer memory system as recited in claim 1, wherein said directory comprises a plurality of tag locations for storing said information, said plurality of tag locations corresponding to each of said plurality of cache lines in said cache memory array.

8. The computer memory system, as recited in claim 1, wherein said information comprises:
    address information corresponding to addresses in a main memory;
    state information indicating whether data stored in a corresponding cache line is valid; and
    fill information for indicating whether at least one of said sub cache line locations within said corresponding cache line has been filled.

9. The computer memory system, as recited in claim 8, wherein said fill information indicates that said at least one of said sub cache line locations has been filled prior to more than one of said sub cache line locations being filled.

10. The computer memory system, as recited in claim 8, wherein said cache enable logic reads said state information and said fill information from said information, and said plurality of sub cache line enable bits associated with said sub cache line locations, to determine whether specific data requested by the processing system is stored in said cache memory array.

11. A method for providing data, from a cache to a processing system, during a cache line fill, where the cache includes a plurality of cache lines, and where each of the plurality of cache lines include a plurality of sub locations, the method comprising:
    directly filling any one of the plurality of sub locations with data;
    tracking which of the plurality of sub locations are filled, and which have not been filled; and
    if requested by the processing system, providing data from sub locations that are filled to the processing system.

12. The method as recited in claim 11 wherein said filling of the plurality of sub locations comprises filling the sub locations one at a time.

13. The method as recited in claim 11 wherein the sub locations are part of a cache line that is addressable by the processing system.

14. The method as recited in claim 13 wherein said step of providing provides the sub locations which are filled from the addressable cache line to the processing system.

15. The method as recited in claim 11 wherein said step of tracking monitors which of the plurality of sub locations within an addressable cache line have been filled, and have not been filled.

16. The method as recited in claim 11 wherein said tracking is performed by cache enable cache enable logic.

17. The method as recited in claim 16 wherein said cache enable logic comprises a plurality of sub cache line enable bits.

18. The method as recited in claim 17, wherein said sub cache line enable bits correspond to sub locations within a cache line during a cache line fill.

19. The method as recited in claim 18, wherein said sub cache line enable bits reflect the status of the sub locations during a cache line fill.

* * * * *